(12) United States Patent
Russell et al.

(10) Patent No.: US 11,100,651 B1
(45) Date of Patent: Aug. 24, 2021

(54) INFRARED INTRUSION DETECTION SYSTEM (IRIDS)

(71) Applicant: National Technology & Engineering Solutions of Sandia, LLC, Albuquerque, NM (US)

(72) Inventors: John L. Russell, Albuquerque, NM (US); Daniel E. Small, Albuquerque, NM (US); Jon David Bradley, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 0 days.

(21) Appl. No.: 16/535,236

(22) Filed: Aug. 8, 2019

(51) Int. Cl.
*G06T 7/20* (2017.01)
*G06T 7/521* (2017.01)
*G06T 17/05* (2011.01)
*H04N 7/18* (2006.01)
*H04N 5/33* (2006.01)
*G01S 17/42* (2006.01)
*G01S 7/48* (2006.01)
*G01S 17/50* (2006.01)
*G08B 13/19* (2006.01)

(52) U.S. Cl.
CPC ............. *G06T 7/20* (2013.01); *G01S 7/4802* (2013.01); *G01S 17/42* (2013.01); *G01S 17/50* (2013.01); *G06T 7/521* (2017.01); *G06T 17/05* (2013.01); *G08B 13/19* (2013.01); *H04N 5/33* (2013.01); *H04N 7/183* (2013.01); *G06T 2207/10028* (2013.01); *G06T 2207/10048* (2013.01); *G06T 2207/30232* (2013.01)

(58) Field of Classification Search
USPC ......................................................... 348/155
See application file for complete search history.

(56) References Cited

U.S. PATENT DOCUMENTS

| | | | |
|---|---|---|---|
| 9,275,302 B1* | 3/2016 | Yan ...................... | G06K 9/3241 |
| 2003/0122930 A1* | 7/2003 | Schofield ............... | H04N 7/181 |
| | | | 348/148 |
| 2006/0139314 A1* | 6/2006 | Bell ...................... | G06F 3/0425 |
| | | | 345/156 |
| 2008/0043106 A1* | 2/2008 | Hassapis ............ | G08B 13/1961 |
| | | | 348/153 |
| 2017/0344223 A1* | 11/2017 | Holzer .................... | G06F 3/011 |
| 2018/0165829 A1* | 6/2018 | Hong ........................ | G06T 7/70 |

(Continued)

*Primary Examiner* — Behrooz M Senfi
(74) *Attorney, Agent, or Firm* — Daniel J. Jenkins

(57) ABSTRACT

A system and method for intrusion detection includes an imager directed towards an object in an interior space. The imager is in data communication with a computer. The computer is arranged to process digital three-dimensional image data received from the imager and programmed to execute a change detection algorithm in response to the processed three-dimensional data to determine movement of the object. The computer generates an alarm output in response to detecting movement of the object above a predetermined threshold. The method includes providing an imager directed towards an object in an interior space; receiving Time of Flight signals by the imager; processing digital three-dimensional image data received from the imager; and executing a change detection algorithm in response to the processed three-dimensional data to determine movement of the object.

20 Claims, 2 Drawing Sheets

(56) References Cited

U.S. PATENT DOCUMENTS

| | | | | |
|---|---|---|---|---|
| 2018/0376088 A1* | 12/2018 | Kuybeda | ............... | H04N 5/3656 |
| 2019/0364244 A1* | 11/2019 | Siminoff | .......... | G08B 13/19695 |
| 2020/0028703 A1* | 1/2020 | Homsi | ................ | H04L 12/2829 |
| 2020/0084353 A1* | 3/2020 | Wacey | ................ | H04N 13/239 |
| 2020/0097755 A1* | 3/2020 | Li | ......................... | G01S 7/4863 |

* cited by examiner

INFRARED INTRUSION DETECTION SYSTEM (IRIDS)

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application generally relates to an infrared (IR) intrusion detection system. The application relates more specifically to an IR range mapping system for intrusion detection sensing.

The current intrusion detection technology uses a balanced magnetic switch, or BMS. BMS was developed over 40 years ago. The BMS uses magnetic reed switches fixed on, e.g., a door frame, and detects when a permanent magnet fixed to the door moves as the door opens.

The need to effectively detect unauthorized door entries is pervasive in the security field, including applications in industry, energy, aerospace, and United States government facilities. The BMS is installed in nearly every secure facility in the United States. Designers of security systems have used the BMS for over 40 years. Because of security limitation of the BMS technology, high security sites are therefore forced to deploy additional sensor systems to augment the limitations of systems that use BMS.

Current BMS technologies require that the permanent magnet BMS module be bolted or welded to a door. Mechanical hardware must be provided or developed for various doors. Any welding or drilling to attach such hardware to high security vault doors may require that the door be recertified for compliance with government security regulations. Since the infrared intrusion detection, or IRIDS, system monitors movement of the door from a distance, mounting hardware is not required on the door. Thus, the integrity of the door is not modified so as to require recertification. In addition, where aesthetics of the door is important, the IRIDS system will not deface the door in any way.

Currently existing intrusion detection systems use Video Analytics to detect door openings. However, Video Analytics may generate nuisance alarms as light levels change. For example, if the lights are switched on or off, or if the lights flicker, a nuisance alarm may be triggered. If the video camera is located in a dark room and directed at the door, light bleeding in from an adjacent hallway may cause a nuisance alarm. Also, variations in ambient sunlight coming through a window, or automobile headlights from a passing automobile, may also generate a nuisance alarm. The need to provide static ambient light conditions has impeded the use of Video Analytics to detect door openings. The IRIDS system does not depend on the light level in the secured environment.

Another existing security alarm system uses a Passive Infrared (PIR) sensor. PIRs are also known to generate excessive nuisance alarms. PIR nuisance alarm sources include hot or cold air influx from heating and air conditioning system, hot air and resulting infrared radiation that emanates from hot computers; windows heated by direct sunlight. The IRIDS sensor will not alarm when subjected to these nuisance alarm sources. The IRIDS provides improved performance over PIR with respect to nuisance alarm, without a loss in detection performance. The IRIDS sensor is not subject to these technical limitations of PIR.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a system for intrusion detection. The system includes an imager directed towards an object in an interior space. The imager is in data communication with a computer. The computer is arranged to process digital three-dimensional image data received from the imager and programmed to execute a change detection algorithm in response to the processed three-dimensional data to determine movement of the object. The computer generates an alarm output in response to detecting movement of the object above a predetermined threshold.

Another embodiment relates to a method for intrusion detection. The method includes providing an imager directed towards an object in an interior space; receiving Time of Flight signals by the imager; processing digital three-dimensional image data received from the imager and executing a change detection algorithm in response to the processed three-dimensional data to determine movement of the object.

Still another embodiment relates to a system for intrusion detection. The system includes an imager directed towards an object in an interior space, in data communication with a computer. The computer is programmed to process digital three-dimensional image data received from the imager and to execute a change detection algorithm in response to the processed three-dimensional data to determine movement of the object. An output signal is generated in response to detecting movement of the object above a predetermined threshold. The change detection algorithm includes a first phase and a second phase. The first phase gathers base-line data and the second phase detects an alarm condition. The first phase continually approximates a depth of each pixel on a sensor using an exponential smoothing approach, calculates a maximum deviation of the respective frame from this exponentially smoothed depth measurement; and generates an estimated convolved error between a scene movement and noise within the sensor associated with a respective pixel. In response to determining that the sensor has gathered a predetermined set of data, the change detection algorithm transitions to the second phase to determine a difference between a measured depth of a respective pixel and a depth of a respective base-line pixel data; and in response to the determined depth differential being greater than a perceived error during base-line-gathering, accumulate a bias towards an alarm state. After the pixel exceeds a predetermined bias, the algorithm generates an alarm signal to the system.

The disclosed methods and system utilizes IR range mapping, also referred to as "point cloud", to create a new and novel intrusion detection sensing capability. This technology may be used for interior intrusion detection and door entry detection. The ability to detect when a door is opening is a capability used in virtually every facility that seeks some level of security. The most common door entry detection technology is the Balanced Magnetic Switch (BMS). The BMS was developed over 40 years ago and is prolific in today's secure facilities, in both industry and government sites. Sandia proposes to combine an IR range mapping sensor with change detection algorithms to detect when a door opens or when an intruder enters the scene. The IRIDS technology will address the historical limitations of the BMS door sensor and will also represent a new solution for high security interior detection challenges.

One advantage of the disclosed IR range mapping intrusion detection system is to replace existing BMS technology, providing a much more robust security solution to detect when a door is opened. The IR range mapping sensor does not need lights to be turned on, changes in light levels will not cause nuisance alarms (a limitation of Video Analytics), and the technique senses movement on any part of the door, effectively sensing movement of the entire door.

Another advantage is a reliable algorithm that can differentiate movement associated with door vibration from movement caused when opening a door. The sensor can be programmed to alarm when an area specified by the user, e.g. 8 square inches, moves a specified distance, e.g., 2.54 cm (1 inch).

Still another advantage of the IRIDS is low cost and open source nature of the available software development tools that enable software developer tools for point cloud imagers.

Other advantages include a non-contact sensor that only requires line of sight with the object of interest. No custom hardware is needed to attach the sensor to the door resulting in easy installation and calibration for high security doors. The IRIDS system is not sensitive to lights being on or off, a limitation of video analytic sensors, so changes in lighting will not cause nuisance alarms. The IRIDS is adaptable to a variety of door designs and vault doors, i.e. doors that open in, open out, or roll up. Further, the IRIDS provides sufficient range resolution to meet US Department of Energy guidelines for door opening for high security sites. No visible light image is created by the IRIDS, a useful feature in classified environments.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
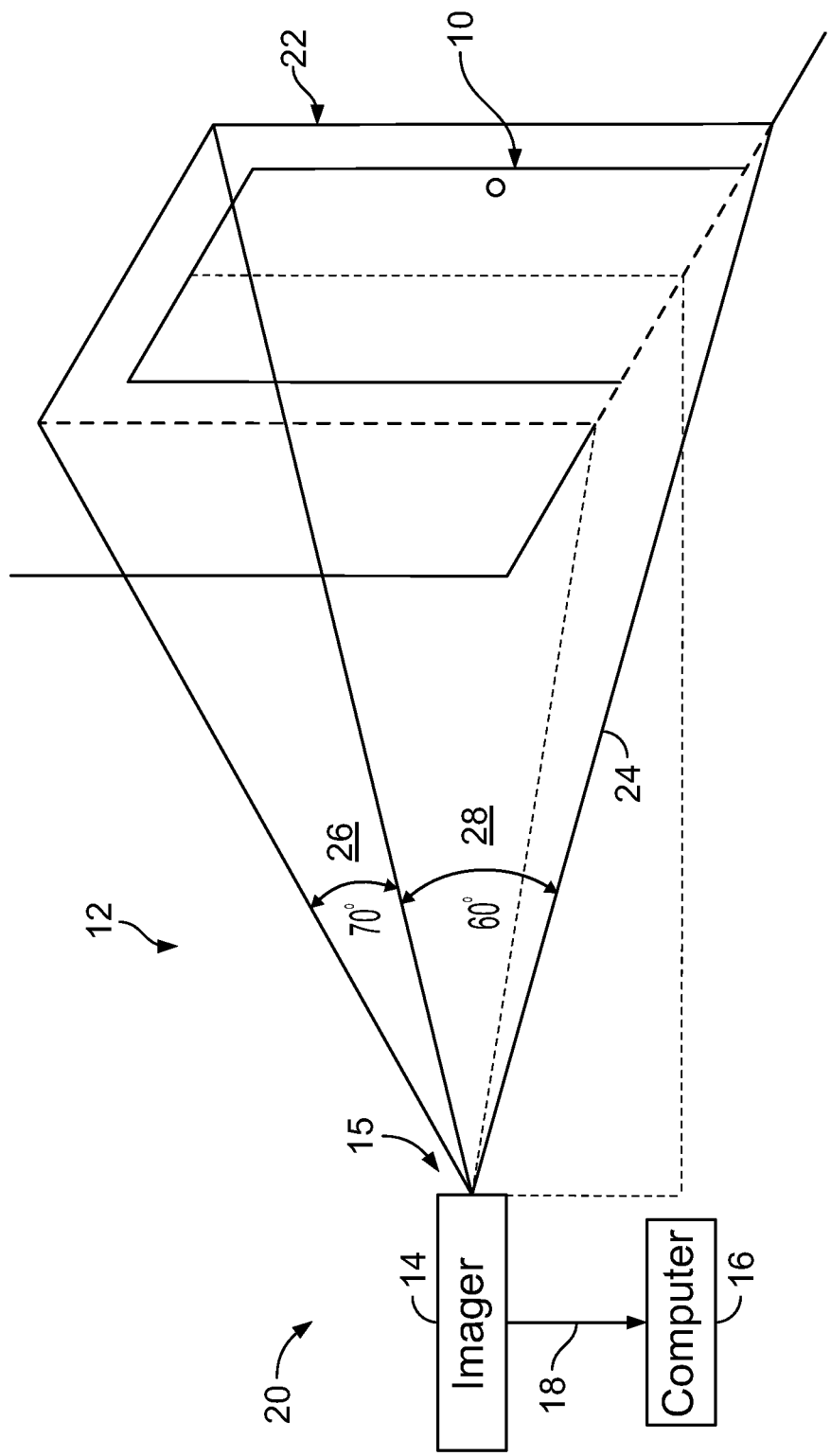
FIG. 1 shows an exemplary IRIDS system.

Referring to FIG. 1, a schematic view of an exemplary IRIDS system is shown. A door 10 provides access to an interior of a space 12. Any movement of door 10 is sensed by an imager 14. Imager 14 creates a range map, as described in further detail below, and communicates with a computer 16 via a data link 18. Computer 16 is configured to execute a motion sensing, or change detection, algorithm. The algorithm determines whether a movement sensed by imager 14 meets a predetermined criteria for generating an alarm signaling an intrusion.

The IRIDS system provides a system and method utilizing a novel, non-contact and non-destructive optical images that overcomes the limitations associated with the BMS. The IRIDS system applies a three-dimensional point cloud, or data set, to create an accurate infrared range map. In one embodiment, point cloud images may be acquired using a Kinect© (V2) imager. Time of Flight (TOF) range mapping is used to generate the point cloud. Any imaging technology that is capable of creating a range map with the necessary spatial and range resolution may be used to generate the point cloud image. The Kinect© (V2) imaging device was developed for video game consoles and creates and has an estimated range of approximately 4.57 m (15 ft.).

The IRIDS 20 applies change detection to the IR range map, to create a volumetric sensor ideal for interior environments. The imager 14 is able to auto-calibrate to its environment, creating a reference IR range map or image. The point cloud range map is based on thousands of IR spots projected by imager 14. Imager 14 uses a pulsed laser and a multifaceted lens. The IRIDs technique can use any of the time of flight (TOF) approaches with the requisite resolution. Imager 14 communicates with computer 16 via data link 18. In an embodiment, the data link may be uniform serial bus, e.g., USB 3.0, and computer may be an Intel model NUC© small form-factor x86 computer with solid-state hard-drives designed by Intel. Alternately, any small form fit computer with USB and the necessary processing capability may be used to process the point cloud data and movement detection algorithms. The IRIDS system 20 may be mounted anywhere in the secure area 12 with line of sight directed to the area, or door, to be protected.

In one embodiment, the maximum range from the IRIDS to the area of interest, or field of view, 22, may be up to 4.57 meters (15 feet). The range may be more or less depending on the resolution needed for reliable detection. The detection envelope 24 of the IRIDS sensor is bound by the field of view (FOV) of the imager 14. In one exemplary embodiment, the IR camera used in the Kinect© (V2) provides a horizontal FOV 26 equal to about 70° and a vertical FOV 28 equal to about 60° respectfully. The sensor is capable of 1 mm (1/25") resolution in depth and a spatial resolution of about 24 $mm^2$ per pixel at a range of 4.57 m. The imager 14 includes an IR camera 15. In an embodiment, camera 15 is a 512×424 pixel and samples at 30 frames per second, resulting in 6.5 million pixels per second being measured.

The IRIDS system 20 is described in an embodiment as a door entry detection system, although any surface or object may be sensed for movement (e.g., windows, drawers, display cases, valuable objects in bank vaults or museums may be secured using the IRIDS system 20). The system operation is described as follows. Initially, IRIDS system 20 creates a reference IR range map or point cloud image of the door in a closed position and secured state. In one embodiment, a 60° vertical FOV will require the IRIDS system to be mounted about 2.13 m (7 ft) from door 10, in order to view a 7-foot-tall door in its entirety. In another embodiment, an IRIDS system may be configured to view a subsection of the door.

When the door is opened, hundreds-to-thousands of range changes are sensed by imager 14. In one exemplary embodiment, sensing may occur 30 times per second. A change detection algorithm based on the range changes establishes an alarm threshold that will minimize nuisance alarms and maximize detection. In one embodiment, the sensor generates an alarm before the door moves one inch. The range resolution of the Kinect© (V2) system is 1 mm (¹⁄₂₅ inch), which provides a maximum of 25 range bins to be traversed before declaring an alarm. The actual distance moved that corresponds with an alarm may be configured to ensure regulatory requirements are met while minimizing nuisance alarms. The resolution of the IR range may be set to allow the door movement corresponding to an alarm condition at 2 mm (¹⁄₁₂ in.). To avoid nuisance alarms caused by door vibrations, the alarm distance may preferably be set between 2 mm and 13 mm (½ in.). A Graphic User Interface (GUI) in computer 16 is provided. GUI enables the alarm distance to be configured on the fly, as needed. Thus, the IRIDS movement detector may be customized to the specific location according to user requirements.

Figure 2:
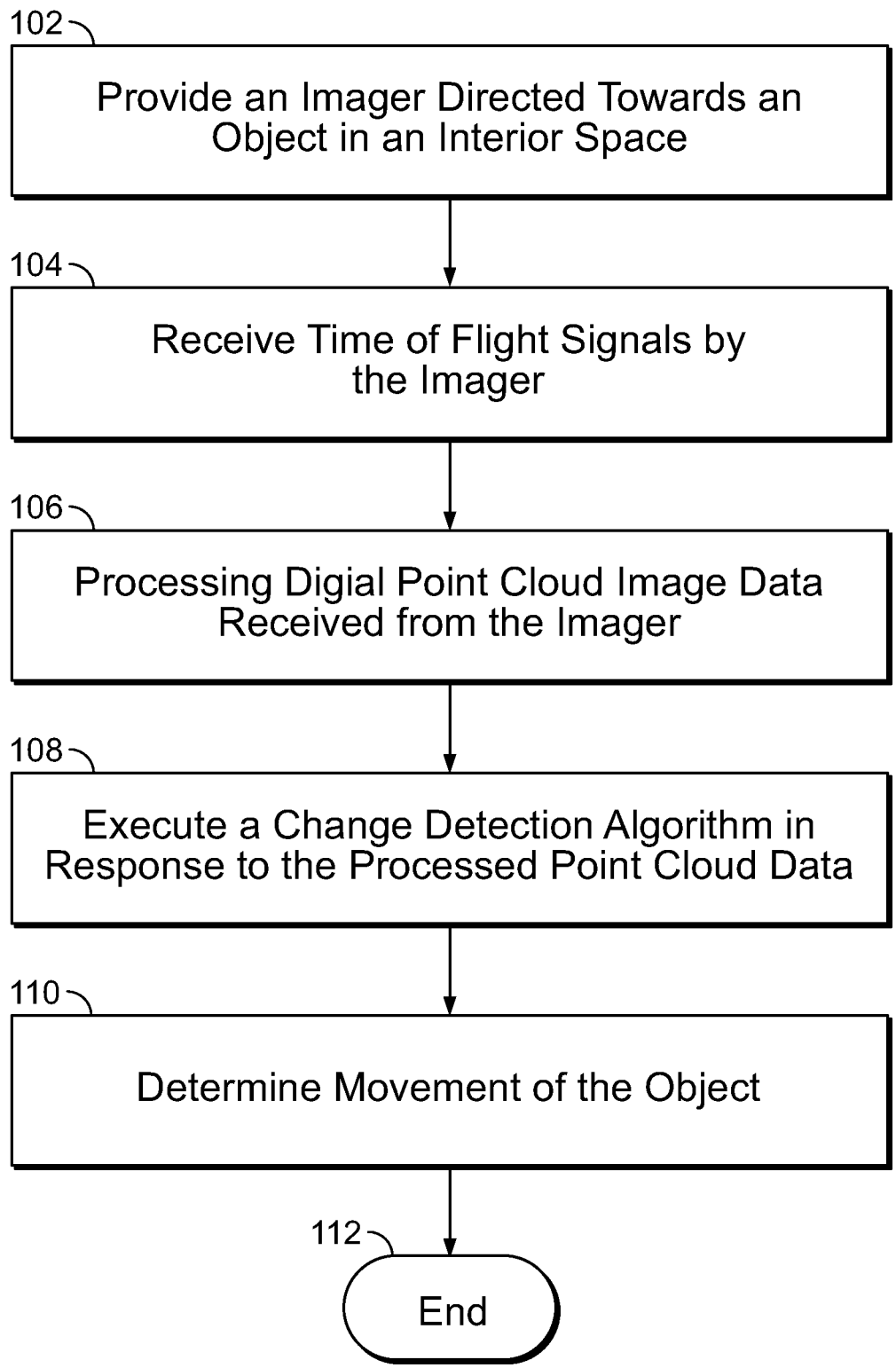
FIG. 2 shows a flow diagram of the method of the system of FIG. 1.

Referring next to FIG. 2, an exemplary method for intrusion detection is described. The method begins with step 102 providing an imager directed towards an object in an interior space. The method proceeds to step 104 receiving Time of Flight signals by the imager. At step 106, the method includes processing digital point cloud image data received from the imager and executing a change detection algorithm in response to the processed point cloud data at step 108. The method determines movement of the object, at step 110, in response to the point cloud data. The method is completed at step 112.

In one embodiment, the algorithm may be implemented in two phases: 1) a base-line data gathering phase, and 2) an alarm detection phase. The initial base-line data gathering phase is described as follows: upon initialization, the algorithm continually approximates the depth of each pixel on the sensor using an exponential smoothing approach. The algorithm further calculates a maximum deviation of the respective frame from this exponentially smoothed depth measurement. This step in the algorithm provides an estimate of the convolved error between a scene movement and noise within the sensor for the respective pixel. When the user determines that the sensor has had sufficient time to gather data, the system transitions to the armed state as described below. The transition step may be configured automatically.

Next, the algorithm proceeds to a second phase in the armed state, as follows: for each pixel in each frame, the system determines the difference between a measured depth of a respective pixel and the baseline depth. If the determined depth differential is greater than the perceived error during base-line-gathering, the respective pixel accumulates an amount of bias towards an alarm state via another exponentially smoothed accumulation. After a pixel exceeds some threshold of alarm bias, the pixel is marked in alarm state. The perceived error may be scaled by a user constant to provide a preferred tolerance, The algorithm determines the area and range that the alarmed pixels represent. Each alarmed pixel represents an area or range which is determined by the projection of the pixels area to the distance at which the pixel was measured. If the displacement of the, i.e. change in range, of the sum of these projected areas exceeds a user-defined threshold consisting of area and displacement, e.g., 100 sq. cm (area), displacement, 0.1 cm, the algorithm generates an alarm signal based on the overall measurement. Due to the other smoothing functions in previous stages, the algorithm does not require a hysteresis function for preventing on/off jittering in situations very near the area alarm threshold.

An exemplary exponential smoothing function for use in the present method is shown in equation 1 below:

$$\text{smoothed} = \text{value}[n] * \text{alpha} + (1.0 - \text{alpha}) * \text{value}[n-1] \qquad \text{Eq. 1}$$

The exponential smoothing function shown in equation 1 provides higher alphas to encourage new values to more quickly effect the smoothed value.

While the exemplary embodiments illustrated in the figures and described herein are presently preferred, it should be understood that these embodiments are offered by way of example only. Accordingly, the present application is not limited to a particular embodiment but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the infrared intrusion detection system and method as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule-based logic and other logic to accomplish the various connection steps, processing steps, comparison steps and decision steps.

The invention claimed is:

1. A system for intrusion detection comprising:
   an imager directed towards an object in an interior space;
   the imager in data communication with a computer;
   the computer configured to:
   process digital three-dimensional image data received from the imager; execute a change detection algorithm in response to the processed three-dimensional data to determine movement of the object; and generate an output signal in response to detecting movement of the object above a predetermined threshold;
   wherein the change detection algorithm comprises a first phase and a second phase; the first phase configured to gather a base-line data, and the second phase to detect an alarm condition; the first phase configured to continually approximate a depth of each pixel on a sensor using an exponential smoothing approach; and to calculate a maximum deviation of the respective frame from this exponentially smoothed depth measurement; and generate an estimated convolved error between a scene movement and noise within the sensor associated with a respective pixel.

2. The system of claim 1, wherein the imager is configured to generate a range map.

3. The system of claim 1, wherein the change detection algorithm comprises a smoothing function.

4. The system of claim 1, wherein the change detection algorithm determines whether a movement sensed by imager meets a predetermined criteria for generating an alarm signaling an intrusion through the object, wherein the object is a monitored door.

5. The system of claim 1, wherein the imager receives the three-dimensional image data in response to signals generated in the imager and directed at the object.

6. The system of claim 1, wherein the three-dimensional image data comprises a three-dimensional point cloud and wherein the imager generates an infrared range map in response to the three-dimensional point cloud data.

7. The system of claim 5, wherein the imager is configured to generate an infrared range map based on Time of Flight (TOF) data.

8. The system of claim 7, wherein the imager applies change detection in response to the infrared range map to create a volumetric sensor.

9. The system of claim 7, wherein the infrared range map is based on thousands of IR spots projected by the imager.

10. The system of claim 1, wherein the imager further comprises a laser and a multifaceted lens.

11. The system of claim 10, wherein the Time of Flight (TOF) measurements are made by integrating light pulse to create a 3-dimensional range map.

12. The system of claim 1, wherein the imager communicates with the computer via data link.

13. The system of claim 1, wherein the computer comprises an Intel model NUC© small form-factor x86 computer with solid-state hard-drives.

14. The system of claim 1, wherein the imager is mounted in the secure area with a line of sight directed to the object.

15. The system of claim 1, wherein a detection envelope generated by the imager is bound by a field of view (FOV) of the imager, and wherein the imager provides a horizontal FOV equal to about 70° and a vertical FOV equal to about 60°.

16. The system of claim 1, wherein the imager further comprises a depth resolution of about 1 mm (½s") and a spatial resolution of about 24 mm$^2$ per pixel at a range of 4.57 m.

17. The system of claim 1, wherein the wherein the imager further comprises an infrared camera.

18. The system of claim 1, wherein the IR camera provides a 512×424 pixel resolution and sampling rate of 30 frames per second; and provides about 6.5 million pixels per second.

19. A method of intrusion detection comprising:
   providing an imager directed towards an object in an interior space;
   receiving Time of Flight signals by the imager;
   processing digital three-dimensional image data received from the imager; and
   executing a change detection algorithm in response to the processed three-dimensional data to determine movement of the object;
   wherein the change detection algorithm comprises a first phase and a second phase; the first phase configured to gather a base-line data, and the second phase to detect an alarm condition; the first phase configured to continually approximate a depth of each pixel on a sensor using an exponential smoothing approach; and to calculate a maximum deviation of the respective frame from this exponentially smoothed depth measurement; and generate an estimated convolved error between a scene movement and noise within the sensor associated with a respective pixel.

20. A system for intrusion detection comprising:
   an imager directed towards an object in an interior space;
   the imager in data communication with a computer;
   the computer configured to:
   process digital three-dimensional image data received from the imager; execute a change detection algorithm in response to the processed three-dimensional data to determine movement of the object; and generate an output signal in response to detecting movement of the object above a predetermined threshold;
   wherein the change detection algorithm comprises a first phase and a second phase; the first phase configured to gather a base-line data, and the second phase to detect an alarm condition; the first phase configured to continually approximate a depth of each pixel on a sensor using an exponential smoothing approach; and to calculate a maximum deviation of the respective frame from this exponentially smoothed depth measurement;

and generate an estimated convolved error between a scene movement and noise within the sensor associated with a respective pixel;

and wherein, in response to determining that the sensor has gathered a predetermined set of data, transition to the second phase; the second phase configured to determine a difference between a measured depth of a respective pixel and a depth of a respective base-line pixel data; and in response to the determined depth differential being greater than a perceived error during base-line-gathering, accumulate a bias towards an alarm state; and after the respective pixel exceeds a predetermined bias, generate an alarm signal.

* * * * *